Sept. 23, 1947.  C. R. HOOVER  2,427,968
POWERED IMPLEMENT CARRIER AND LOADER
Filed April 20, 1945  4 Sheets-Sheet 1
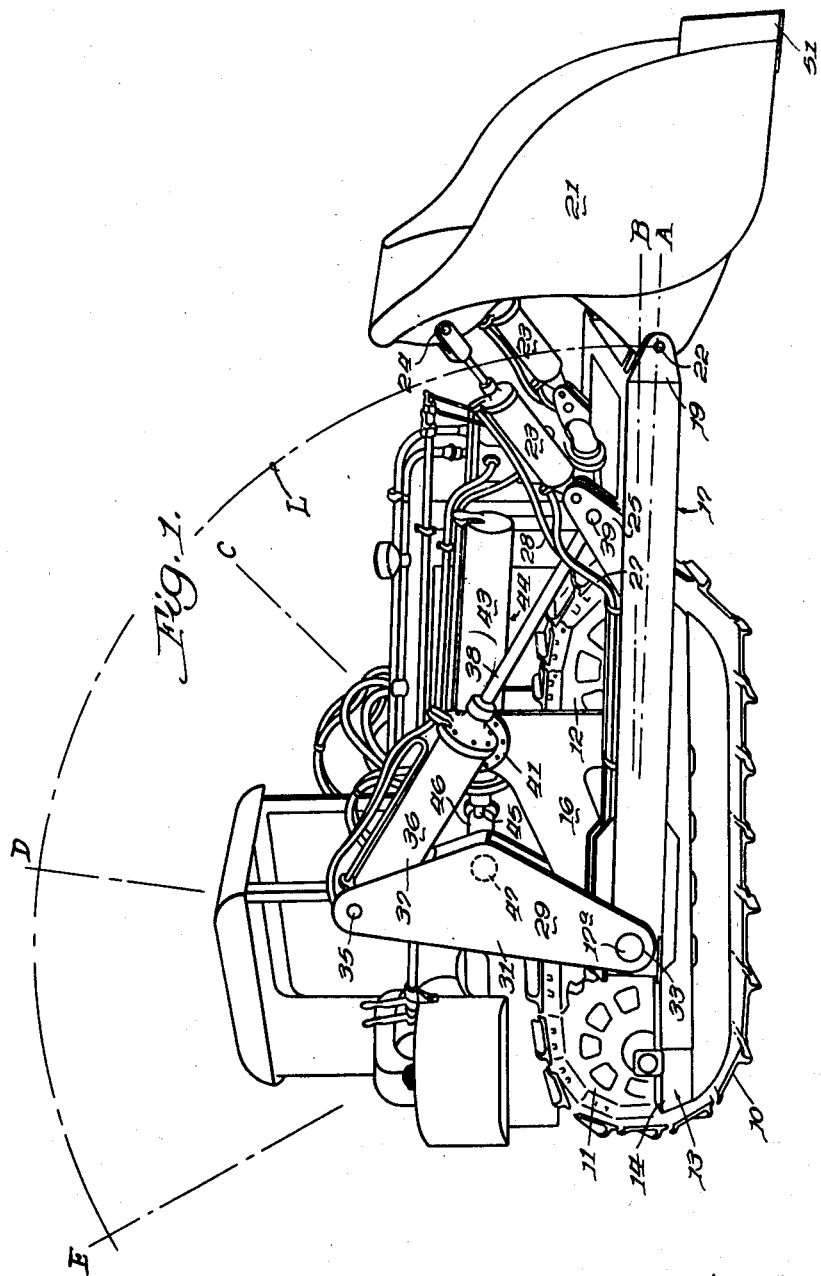
Inventor:
Curtis R. Hoover.
By Stone, Artman & Bisson
Attys.

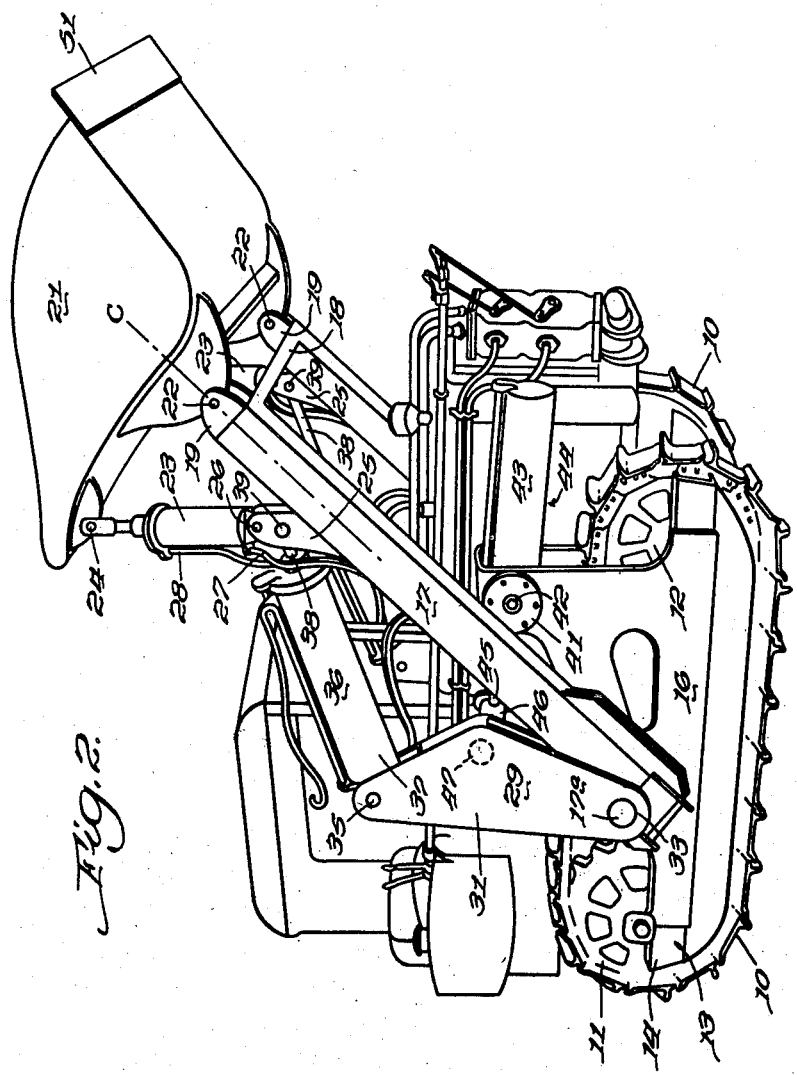

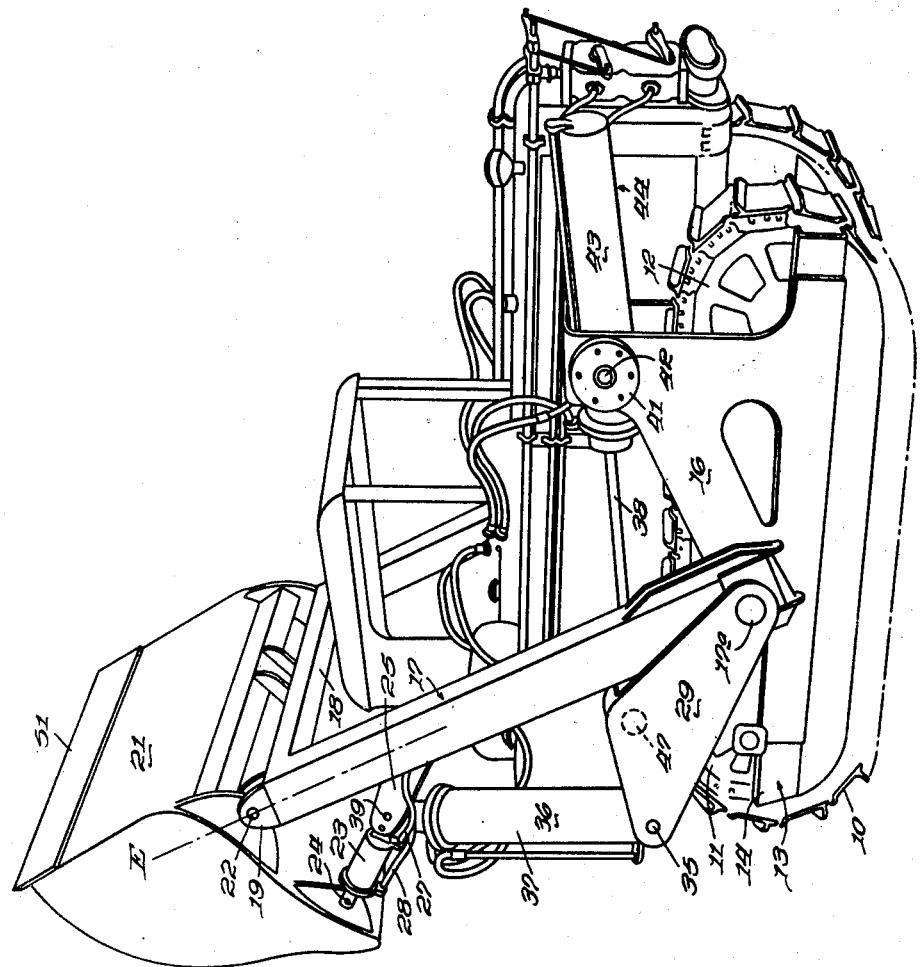

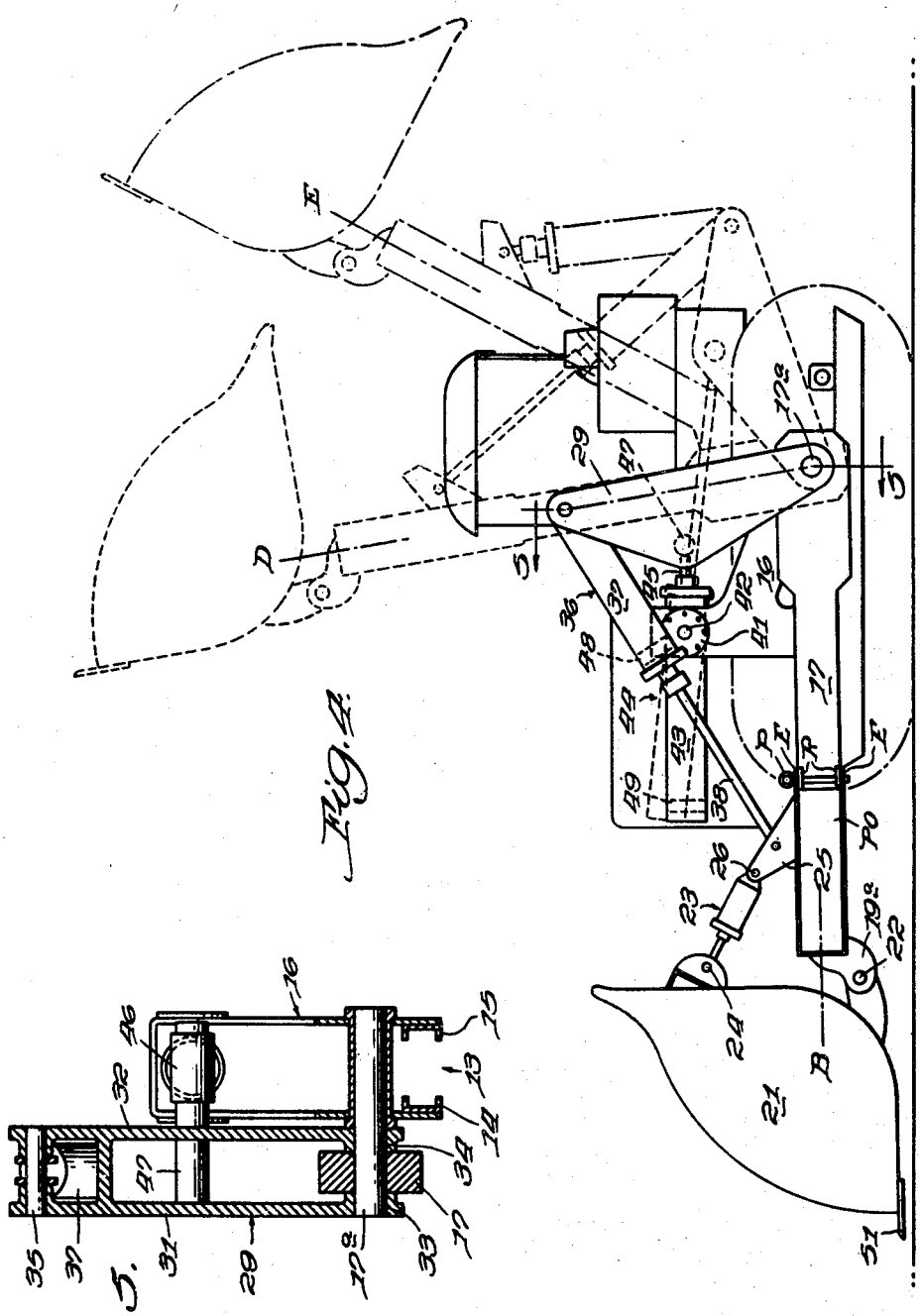

Patented Sept. 23, 1947

2,427,968

UNITED STATES PATENT OFFICE 2,427,968

POWERED IMPLEMENT CARRIER AND LOADER

Curtis R. Hoover, Edmonton, Alberta, Canada

Application April 20, 1945, Serial No. 589,313
In Canada May 19, 1944

8 Claims. (Cl. 214—140)

This invention concerns vehicle-mounted material handling apparatus and relates more particularly to a type of apparatus which is operable to displace the implement through a path arching over the vehicle.

When a scoop, for example, is mounted on an implement-carrier portion of the apparatus, materials as earth, gravel and snow can be scooped up, lifted and transported over the vehicle to the other side thereof for deposit in a truck body or as otherwise desired.

I am aware of prior art structures, such as that shown in U. S. Patent No. 1,371,344 to J. C. Brackett, which are operable to lift a shovel above the vehicle, but which are unadapted to carry the shovel beyond the zenith of the arc for dumping at the other side of the vehicle. Attention is also invited to U. S. Patent No. 2,316,-760 to T. K. Andersen et al. which discloses an apparatus operable to transport a scoop over a vehicle to dump on the side opposite from the loading side but by means of such a combination of elements that the scoop is unstable when in the vicinity of the highest point in the arched path of its movement.

The general object of the present invention is the provision of an improved fluid actuated ram control employing a plurality of fluid actuated ram devices operable to positively select and maintain any number of positions of the scoop within the path through which it is displaceable upwardly over the vehicle. This apparatus has the advantage of being operable to place the yoke or boom structure upon which the shovel or bucket is mounted in a selected position over the vehicle and maintain it in such position with stability so that the vehicle may be moved from one place to another while supporting the loaded shovel or bucket in a fashion that the contents thereof will not be spilled. There is a further advantage in that the shovel or bucket can be maintained in such a position that the weight thereof and of its contents will be distributed over the frame of the vehicle and its traction structure, thereby avoiding the contingency of imposing excessive stress upon any of the vehicle parts. This latter advantage prevails irrespective of the slope of the terrain upon which the vehicle rests because of the control of the apparatus which enables the operator to select the point in the path of movement of the shovel at which it shall be rigidly maintained during transport. For example, if the vehicle were facing downwardly of a slope at the time the scoop is loaded, the apparatus would be operated for lifting the scoop through a greater arc for placing it in the desired position over the vehicle prior to backing the vehicle up the slope to a place for dumping the scoop.

A further object of the invention is the provision of a plurality of fluid actuated devices so operably connected with the scoop-lifting apparatus that these devices can be successively actuated to enable each to impose its force efficiently, that is, the apparatus is so constructed and arranged that a long swinging arc is attainable by the scoop-carrying boom or yoke by successive actuation of the hydraulic devices so that each, while it is being actuated, can apply a force component tangentially of the arc of a magnitude relatively large relatively to the principal force exerted by the hydraulic device from which the component is derived.

These and other desirable objects inherent in and encompassed by the invention will be more fully comprehended after reading the ensuing description with reference to the annexed drawings, wherein:

Fig. 1 is a perspective view of a crawler tractor and a preferred form of the invention installed thereon, illustrating the apparatus constituting the invention in an actuation status wherein the scoop is in its lowered position at the front of the vehicle;

Fig. 2 is a view similar to Fig. 1 illustrating an operating status of the apparatus in which the scoop or bucket is in a partially elevated position;

Fig. 3 is a view similar to Figs. 1 and 2 but showing the scoop in a dumping position at the rear of the vehicle;

Fig. 4 is a side elevational view of the apparatus illustrating the scoop in a lowered position at the front of the vehicle and showing in dotted lines a transport position of the scoop and in dot-dash lines the dumping position thereof at the rear of the vehicle; and Fig. 5 is a vertical sectional view taken on the line 5—5 of Fig. 4 to illustrate the connection of the apparatus to one of the track frames of the vehicle.

With continued reference to the drawings, a crawler type of tractor T equipped with fluid pressure generating apparatus, preferably a hydraulic pressure system, is shown with a preferred form of the invention mounted thereon. The tractor has the conventional articulated propelling tracks 10 upon its opposite sides. Each track is driven by a driving sprocket 11 at the rear end of the tractor and carried by an idler sprocket 12 at its front end. These sprockets 11 and 12 are suitably journalled upon a fore-and-aft extending track frame 13 including channel members 14 and 15 which are shown in section in Fig. 5. At each side of the tractor there is provided a U-shaped bracket structure 16 of which one is shown in Fig. 5, and these bracket structures provide for the pivotal support of implement-carrying structures each of which includes a boom 17 pivotable about a pivot shaft 17a anchored in its associated bracket 16. The booms 17 are connected at their free end portions by a cross member 18 which, together with the booms 17, forms a yoke swingable upwardly about its pivotal connections with the shaft 17a to swing implement-carrying portions 19 of said booms through an arc illustrated by dot-dash line L in Fig. 1. In the present instance, a scoop or bucket is pivotally connected with the implement-carrying portions 19 of the booms 17 at 22 and the pivotal relation of said scoop relatively to the booms is selected and maintained by hydraulic ram devices 23 each connected to an upper portion of the scoop by a pin 24 and connected to ears 25 on its respectively associated boom 17 by a pin 26. Fluid under pressure is forcibly introductive into either end of the cylinder portion of each device 23 by means of flexible hoses 27 and 28, while being discharged through the other of said hoses to control the distension of the devices. Any type of conventional valve means is employable for controlling the direction of flow of fluid through the condits 27 and 28 or for preventing such flow and thereby hydraulically locking the scoop in a desired position of pivotal adjustment.

Each boom 17 comprises an element of a polygonal structure which is swingable for moving the implement-carrying portion of the booms through the arc extending upwardly over the vehicle. In the present arrangement these polygonal structures are triangular and in addition to the boom 17 comprise a force reaction member 29 having a lower end portion pivotally connected with the pivot rod 17a. These force reaction elements or members 29 comprise similarly shaped outer and inner plates 31 and 32 containing bearings 33 and 34 in their lower ends upon opposite sides of the footing portion of their associated boom 17. It is these footing portions of the booms which are pivotally connected with the pivot rods 17a.

An upper end portion of each force reaction member 29 is provided with a pin 35 for the pivotal connection of the upper end of a respective fluid actuated ram 36 comprising a cylinder 37, the usual piston 48, Fig. 4, within the cylinder and a piston rod 38 which is pivotally connected with its associated boom 17 through a pivot pin 39 in the ears 25. These rams 36 form the third sides of the polygonal implement carrying structures.

Forward portions of the brackets 16 carry bearings 41 for coaxial trunnions 42 projecting oppositely from the sides of cylinders 43 of additional fluid actuated ram devices 44. This mounting of the cylinders 43 upon their respective brackets 16 enables these cylinders to be pivoted in a vertical plane between the positions shown in solid line and in dotted line in Fig. 4. Piston rods 45 of the devices 44 are pivotally connected by end bearings 46 with inwardly projecting portions of pins 47 anchored in the force reaction members 29.

Fluid under pressure can be selectively introduced into the ends of these cylinders 37 and 43 as explained above with respect to the cylinders 23 while the fluid is exhausted from the other ends of these cylinders. In this manner, pistons 48 and 49 in these cylinders can be selectively positioned and locked lengthwise of such cylinders.

In Fig. 4 the closed or front end of the yoke is concealed by an adapter PO detachably connected to the booms 17 by pins P which project through apertured ears E and R respectively upon said adapter and said booms 17. The implement attaching portions 19a on PO correspond to the portions 19 in Figs. 1, 2 and 3.

Fig. 1 shows the scoop 21 in a lowered position A along the arcuate path of displacement for the scoop. While in position A the blade 51 can be propelled into and beneath a portion of a body of material to be lifted. Forcing the blade 51 under or into a body of material is accomplished of course by causing the tractor to be driven forwardly. Subsequent to the loading of the scoop in this manner, it may be elevated to the position C illustrated in Fig. 2 by the introduction of fluid by pressure into the forward ends of the cylinders 37 for forcing the pistons 48 rearwardly and thereby shortening those legs of the polygonal implement-carrying structures formed by the fluid actuated ram devices 36. When the ram devices 36 have reached their limit of shortening, the polygonal structures will be distorted the maximum amount obtainable by such operation pursuant to lifting the loaded scoop to the position C. The apparatus is controlled for placing the scoop in position C when it is more convenient to dump the scoop into a truck or other place of discharge at the front of the vehicle upon which the present apparatus is mounted. When the scoop is disposed above the place of discharge, fluid will be introduced into the lower ends of the cylinders 23 for pushing the then backmost side of the scoop upwardly to lower the blade 51 and cause the scoop to dump.

Should it be desired to empty the scoop rearwardly of the vehicle subsequently to the scoop having been raised on the position C by the energization of the hydraulic ram devices 36 as above described, the operator can accomplish this act by introducing fluid into the forward ends of the cylinders 43 and thereby exerting force against the pins 47 of the force reaction members 29 to cause these members and the polygonal structures of which they are a part to swing backwardly about the pivots at the footings of the booms 17. When the hydraulic ram devices 44 have been fully distended, the apparatus will incur the status illustrated in Fig. 3 wherein the scoop is at position E and the normally upper edge 52 thereof is positioned downwardly so the contents of the scoop will discharge over such edge as desired.

After the scoop has been raised to the position C of Fig. 2, should it be necessary for the vehicle to transport the scoop any substantial distance prior to unloading the same, the apparatus will preferably be actuated to first dispose the scoop in a transporting position D illustrated in Fig. 4. Subsequent to having placed the scoop in position C, the position D is incurred by introducing only sufficient fluid into the front end of the cylinder 43 for swinging the scoop to position D instead of all the way to the position E. Subsequent to the scoop being stationed in position D, it can be locked in that position by manipulating the control valve or valves for preventing ingress or egress of fluid from either end of the cylinder 43. With the scoop thus positively maintained in the transport position D, the vehicle can be driven to the place of discharge without danger of spilling part of the contents of the scoop. Moreover, with the scoop disposed in the transport position D, the combined weight of the boom, scoop and scoop contents is more evenly distributed upon the vehicle track to avoid excessive stress thereon and also to spread the force uniformly over the ground surface engaged by the track so neither end of the track will sink more than the other. Assuming the scoop to have been maneuvered into the transport position D by first energizing the ram 36 and then energizing the ram 44, in the above described manner, should the vehicle be transported up or down hill to the place of discharge, the ram 44 can be selectively energized for swinging the yoke either forwardly or rearwardly to compensate for the slope and thereby maintain the desired weight distribution of the loaded scoop and a position in which the scoop contents will not be spilled.

The sequence in the operation of the ram devices 36 and 44 may be selected as desired, or these devices may be concurrently energized if desired. With the present arrangement in which the cylinders 37 and 43 are substantially the same diameter, concurrent energization of the ram devices from the same source of pressure fluid would first cause actuation of the devices 36. This is because the ram devices 36 apply their forces to the yoke with somewhat greater mechanical advantage than the devices 44 apply their forces to the force reaction members 29. However, the operating sequence of the ram devices 36 and 44 when concurrently energized can be changed by selecting a cylinder 43 of sufficiently greater diameter. In the present arrangement, concurrent energization of the ram devices would first cause the devices 36 to be completely actuated for raising the scoop to the position C and thereupon the fluid would enter the front ends of the cylinders 43 for continuing the upward and backward movement of the scoop until the energizing fluid should be cut off or the dumping position E reached. This explanation with respect to concurrent energization of the rams assumes that the fluid delivery capacity of the pressure fluid source is insufficient to effectively simultaneously energize the ram devices. If ample fluid capacity and pressure were available both ram devices would, of course, operate simultaneously with the effect of moving the scoop at greater speed.

At times, it will be desirable to lift the scoop from the positions A or B directly to the transport position D. This can be done by energizing the ram devices 44. When these ram devices 44 have become fully distended, the apparatus will be in the position illustrated by the dotted lines in Fig. 4 where the scoop is shown in the normal transport position. The scoop is subsequently movable into the dumping position E by energization of the ram devices 36 which would place the apparatus with its components in the positions illustrated by the dot-dash lines in Fig. 4.

Sometimes it is desirable to transport the scoop a short distance while the blade 51 is only slightly above the ground. This can be accomplished by energizing either set 36—36 or 44—44 of the ram devices, say while the scoop is in the position A, to lift the same to some such position as B. Slightly elevated positions as B will be utilized more frequently when the implement is a scraper or dozer blade, although a transport position as D is also advantageous in the case of a blade implement, crane or other lifting device or rigging, or any other implement or device so no undue stress will be concentrated on the forward part of the tracks when such implement is to be transported a substantial distance.

Having thus described a preferred form of the invention, with the view of clearly illustrating the same, I claim:

1. In a powered implement carrier and loader apparatus for use upon a vehicle, a polygonal implement-carrier structure including three articulately connected swingable elements forming respective sides of such structure, means for mounting said structure on a side of the vehicle with one of said elements having a pivotal connection therewith and extending therefrom for supporting an implement at an end of the vehicle, said mounting means facilitating swinging of said elements in a vertical plane for displacing an implement so supported thereon within a path extending upwardly over the vehicle from such end, said path being generated about said pivotal connection, fluid-actuated ram means reactable between the vehicle and said structure for so swinging said elements to change the position of the implement in said path, and one of said elements including fluid-actuated ram means operable to forcibly change the length of such element to distort said structure and thereby also displace the implement in said path.

2. In a powered implement carrier and loader apparatus for use upon a vehicle, a triangular implement-carrier structure including articulately connected elements constituting respective side elements of such structure, means for mounting said structure on a side of the vehicle and including a pivotal connection of one of said elements with the vehicle in a manner to extend lengthwise thereof for supporting an implement at an end of the vehicle, said mounting means facilitating pivoting of said structure in a vertical plane for displacing an implement so supported thereon within a path extending upwardly over the vehicle from such end, another of the articulately connected elements of said structure including a first double-acting hydraulic ram means reactable between the implement supporting element and an anchorage portion of said polygonal structure and hydraulically lockable to rigidify said structure, and a second double-acting hydraulic ram means reactable between the vehicle and the rigidified structure for pivoting the same to change the position of the implement in said path, said second ram means also being hydraulically lockable to stabilize said anchorage portion of said structure against which the first ram means is reactable, and the first hydraulic ram means being operable to forcibly change the length of the one structure element to cooperate with the hydraulically locked second ram means for distorting said structure and thereby also displace the implement in said path.

3. In a powered implement carrier and loader apparatus for use upon a vehicle, a frame, an implement carrier structure comprising an implement carrier boom pivotally connected with said frame, a force reaction member pivotally connected with said frame and a fluid-actuated ram extending between said boom and said member and pivotally connected with each thereof, said pivotal connections with the frame facilitating swinging movement of said reaction member, said ram and said boom to move an implement on the latter in a path extending from an end of the vehicle upwardly over over such vehicle, and a second fluid-actuated ram reactable between the frame and said force reaction member for so swinging the structure to move the implement in said path, and the first ram being reactable between said force reaction member and the boom to pivot said boom for increasing the range of movement of the implement.

4. In a powered implement carrier and loader apparatus for use upon a vehicle, an implement carrier boom, means for pivotally mounting said boom on the vehicle to dispose an implement attaching portion thereof for movement in a path extending from an end of the vehicle upwardly over the same pursuant to pivoting of the boom, a force reaction member, means for pivotally mounting said member on the vehicle, a first fluid-actuated ram means in force transmitting relation between said member and said boom to pivot said boom pursuant to pivoting of said member, and a second fluid-actuated ram reactable between the vehicle and said member to selectively pivot the same and said boom or alternatively to prevent pivoting of said member, and the first ram being reactable between said member and said boom to pivot the latter.

5. In a powered implement carrier and loader apparatus for use upon a vehicle, an implement carrier structure comprising a force reaction member and a boom articulately associated with such member and a fluid motor unit pivotally connected between said member and said boom, said boom having an implement carrier end portion, means for connecting said member and said boom with the vehicle for swingably mounting said structure on the vehicle to provide for movement of the boom to displace its implement carrier portion in a path extending upwardly from a loading position at an end of the vehicle to a transport position above the vehicle and beyond such transport position to a dumping position, a second fluid motor unit reactable between the vehicle and said reaction member to swing said structure sufficiently to displace the boom's implement carrier portion between the loading and transport positions, and the first fluid motor unit being reactable between said reaction member and the boom to move the latter for displacing the implement carrier portion in said path a distance equal to at least the distance between the transport and dumping positions.

6. In a powered implement carrier and loader apparatus for use upon a vehicle, an implement carrier structure comprising a force reaction member a boom articulately associated with such member and a two-way hydraulic ram device pivotally connected between said member and said boom, said boom having an implement carrier end portion, means including a pivotal connection between the boom and vehicle for swingably mounting said structure on the vehicle to provide for movement of the boom to displace its implement carrier portion in a path extending upwardly from a loading position at an end of the vehicle to a transport position above the vehicle and beyond such transport position to a dumping position, a second two-way hydraulic ram device reactable between the vehicle and said reaction member to forcibly swing said structure to displace the boom's implement carrier portion selectively between the loading and transport positions, and the first ram device extending from said member generally toward said implement carrier portion of the boom and reactable between the reaction member and said boom to forcibly move the latter selectively in said path relatively to said member within a range having a span at least substantially as great as the distance between the transport and dumping positions.

7. In a powered implement carrier and loader apparatus employable upon a crawler-type tractor provided with a track frame; bracket means mountable on said track frame to arrange respective parts thereof forwardly and rearwardly with reference to the tractor, a force reaction member having upper and lower end portions, a boom having an implement-carrier end portion and a root end portion, means for pivotally connecting the lower end portion of said member and the root end portion of said boom with one of said bracket means parts at relatively low elevation and to accommodate relative pivotal movement of said member and boom substantially within a common vertical plane, fluid-actuated ram means reactable between the upper end portion of said member and a portion of the boom spaced from its root end portion to control the spacing of said implement-carrier portion from the upper end of said member, and a second fluid-actuated ram means reactable between an intermediate portion of said force reaction member and the other of said bracket parts at a relatively higher elevation than said pivotally connecting means.

8. In a powered carrier for an implement or the like employable upon a crawler-type tractor provided with a track frame; a bracket mounted on said frame in a position disposing respective parts of such bracket relatively forwardly and rearwardly with respect to the tractor, a lever having upper and lower end portions of which the latter is pivotally connected with one of said parts of said frame to adapt swinging movement of the lever in a vertical plane extending fore and aft of the tractor, a boom having an implement-carrier end portion and a root end portion of which the latter portion is pivotally connected with said one part of the bracket to adapt swinging movement of such boom in a vertical plane extending fore and aft of the tractor, fluid-actuated ram means connected between the upper end portion of said lever and said boom to produce relative swinging of the lever and boom when said ram means is actuated, and a second fluid-actuated ram means connected between an upper portion of the lever and the other of said bracket parts at a position above the lever's lower end pivotal connection, the first ram means being operable to cause the boom to swing with said lever, and the second ram means being actuatable to swing both the lever and boom while the first ram means is so operable.

CURTIS R. HOOVER.

REFERENCES CITED

The following references are of record in the file of this patent:

UNITED STATES PATENTS

| Number | Name | Date |
| --- | --- | --- |
| 1,371,344 | Brackett | Mar. 15, 1921 |
| 1,590,662 | Zygalinski | June 29, 1926 |
| 2,109,388 | Heller | Feb. 22, 1938 |
| 2,296,827 | Andersen et al. | Sept. 29, 1942 |
| 2,303,379 | Mork | Dec. 1, 1942 |
| 2,326,338 | Drott et al. | Aug. 10, 1943 |
| 2,338,361 | Shinn | Jan. 4, 1944 |
| 2,348,796 | Ferwerda et al. | May 16, 1944 |